(12) United States Patent
Weaver (10) Patent No.: US 7,936,961 B2
(45) Date of Patent: May 3, 2011

(54) HIDDEN DROP STORAGE DEVICE

(75) Inventor: Patrick A. Weaver, Baden, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 12/428,813

(22) Filed: Apr. 23, 2009

(65) Prior Publication Data

US 2010/0272407 A1  Oct. 28, 2010

(51) Int. Cl.
*G02B 6/00* (2006.01)
*H01H 9/02* (2006.01)

(52) U.S. Cl. .......... 385/135; 385/134; 385/137; 174/58

(58) Field of Classification Search .......... 385/135, 385/134, 137; 174/58
See application file for complete search history.

(56) References Cited

U.S. PATENT DOCUMENTS

| | | | | |
|---|---|---|---|---|
| 5,721,394 A | * | 2/1998 | Mulks | 174/502 |
| 2006/0221889 A1 | * | 10/2006 | Murdock et al. | 370/328 |
| 2007/0206780 A1 | * | 9/2007 | Kerry et al. | 379/413.02 |
| 2007/0251167 A1 | * | 11/2007 | Kaplan | 52/287.1 |
| 2008/0011990 A1 | * | 1/2008 | Kostet et al. | 254/134 |
| 2009/0026324 A1 | * | 1/2009 | Hensley et al. | 248/65 |
| 2009/0211171 A1 | * | 8/2009 | Summers | 52/27 |
| 2010/0018769 A1 | * | 1/2010 | Massey | 174/77 R |
| 2010/0021123 A1 | * | 1/2010 | Massey | 385/138 |

* cited by examiner

*Primary Examiner* — Uyen-Chau N Le
*Assistant Examiner* — Chris H Chu (57) ABSTRACT

In a multi-family building, such as a condominium complex, a device for storing optical fiber cable for use by a resident, the cable being stored in a hidden manner. The device can fit behind hallway molding and penetrates the hallway drywall. The cable is fed through an aperture in the device and is stored in a bag attached to the device. The bag is located in the dead-space between the hallway-drywall and the drywall of the residence for which the stored cable is intended. When the occupant of the residence subscribes for cable service, the service technician retrieves the stored cable from its hidden location and feeds it into the residence at that time.

23 Claims, 6 Drawing Sheets

HIDDEN DROP STORAGE DEVICE

BACKGROUND

For a multi-family residential building, such as a condominium complex, installation of fiber optic cable service to the building first requires connecting a large number of individual optical fiber cables bundled within one or more trunk cables from a telecommunications service provider to a centralized service terminal in the building. Each individual fiber-optic cable in the trunk cable can be intended for a different residence within the building. However, since every resident of a condominium building shall not subscribe for fiber-optic service immediately, and installing service to all residents in the building can take place over a period of years, there is a question about the best storage location for each individual fiber-optic cable, also known as a "drop."

One technique currently used is to run each individual fiber-optic cable from the centralized service terminal behind hollow, snap-on type wall molding in the hallways of the multi-family complex to the front door area in the hallway immediately outside a respective residence. The molding can be located on the wall near the ceiling or at the wall/ceiling line. Then, the cable installer leaves a coil of that cable of sufficient length for eventual installation purposes in a storage box in the hallway outside that residential unit. This is usually not popular with residents because a storage box is unsightly and inconvenient and that box can remain there for years.

Another technique is to run each individual fiber-optic cable behind the molding as before, but to coil a sufficient excess amount at each resident's front door area and try to tuck the coiled excess behind the hollow, snap-on molding, in an attempt to provide a better storage location. However, this generally causes a bulge behind the molding, resulting in a misfit between the molding and the molding-retainer to which it is attached. If the molding is disturbed in this manner, it thereafter tends to loosen and/or detach from the wall in the hallway. This result is also unacceptable to the residents.

Therefore, a need exists for a technique to provide convenient and invisible locations, in a multi-family residential building and/or a multi-tenant commercial building, at which to store fiber-optic cable, while the telecommunications company awaits requests for fiber-optic service inside each individual residence or commercial space.

DETAILED DESCRIPTION OF PREFERRED EMBODIMENTS

In this description, the same reference numeral in different Figs. refers to the same entity. Otherwise, reference numerals of each Fig. start with the same number as the number of that Fig. For example, FIG. 3 has numerals in the "300" category and FIG. 4 has numerals in the "400" category, etc.

In overview, a service technician routes a fiber optic cable from a service terminal at a centralized location in a building, such as a large condominium complex, along inner hallways. The cable is hidden. For example, the cable can be hidden behind hollow wall-moldings (which may be of a plastic snap-on variety), running along the walls near or at the ceiling. Or, the cable is otherwise innocuously deployed, on its path to the hallway leading to a front door area of a particular resident. At that location, with the hollow wall-molding from hallway-drywall adjacent the resident's unit removed, the technician drills or cuts a hole in the exposed space otherwise covered by that molding. The hallway-drywall associated with the exposed drywall space and a parallel, companion resident's-drywall approximately four inches away, together form the wall between the hallway and this residence as well as create a dead-space there-between.

The service technician then inserts an embodiment of the hidden drop storage device including a storage bag in accordance with principles of the present invention into the hole formed in the hallway-drywall so that the attached storage bag is deployed in the dead-space, hanging from the portion of the device inserted in the drywall. The technician secures the device to the hallway-drywall and, thereafter, from the hallway, feeds the proper length of the cable, e.g., 10-50 feet, depending on the geometry of the residence, into the bag of the storage device to be stored for subsequent proper deployment of communication services inside this residence or condominium unit. The technician then hides the remainder of this cable which is still exposed in the hallway, for example, by attaching it to the hallway-drywall along the exposed molding route, replacing the molding over the routed cable and then leaving the area without operatively connecting the cable to the resident. The residential space can be referred to as first space and the hallway space can be referred to as second space.

At some future time, if and when fiber optic service is ordered by an occupant of that residence, a technician returns to that hallway location. The technician removes the molding, and inserts a hand-tool such as a long screwdriver, or a long and thin drill-bit, into an aperture in the hidden drop storage device through which the previously-fed cable also remains inserted. The tool causes the storage device to dis-assemble along pre-determined breakaway lines and causes the bag to fall away, thereby freeing the cable and allowing it to dangle inside the deadspace. The technician then punctures, or drills, a new hole in the companion drywall, i.e., the resident-drywall. The hand tool, or drill bit, and the fiber-optic cable momentarily share space together in the aperture formed in the hidden drop storage device, and there is sufficient room in the aperture for both. After the new hole is made in the resident-drywall, the technician enters the residence and, using a wire and hook tool, or similar tool, fishes the optical fiber into the residence through the new hole. Other techniques to accomplish this are discussed below. The new hole is small and innocuous and it, as well as the cable, can be covered by a molding or panduit. Panduit is a term used for plastic molding that sticks to baseboards, walls, etc., and which is used as conduit. The cable inside the residence leads to an Optical Network Terminal (ONT) typically located in a closet or other hidden area.

Figures 1, 2:
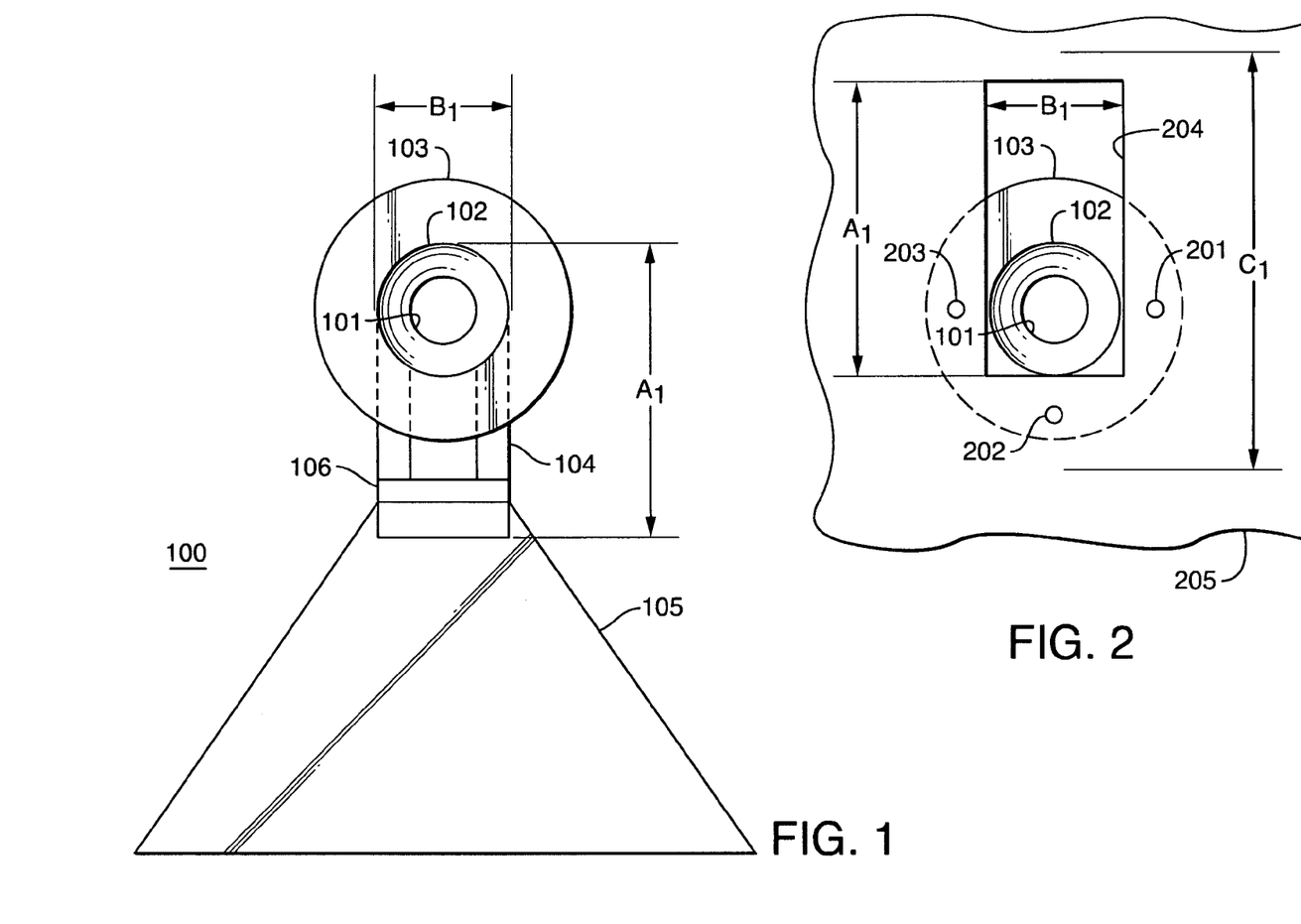
FIG. 1 is an exemplary and schematic front view of an un-mounted hidden drop storage device in accordance with principles of the present invention.
FIG. 2 is an exemplary and schematic front view of the hidden drop storage device of FIG. 1 as it might appear to someone located in a hallway when the device is mounted through a hole in a hallway-drywall and the wall molding, behind which the hole is located, has not yet been replaced.

FIG. 1 is an exemplary and schematic front view of a hidden drop storage device 100 in accordance with principles of the present invention before it is deployed into and through a hallway wall. Aperture 101 is a round hole concentrically formed within cylindrical insert 102 which forms part of device 100. Round lip 103 is concentrically formed together with cylindrical insert 102 as a pre-molded plastic piece. Downward-oriented portion 104 results from a right-angle curved continuation of cylindrical insert 102 and is, therefore, angularly displaced by approximately ninety degrees from the above-noted concentric axis. Container 105, in a particular embodiment, is a plastic bag having a trapezoidal shape as shown and possibly made from clear plastic. The opening or neck of container 105 is attached around the periphery of downward-oriented portion 104, and held in place by clip 106, and is thereby ready to accumulate and store cable that is fed through aperture 101.

Aperture 101 has sufficiently large diameter, e.g., approximate seven millimeters, to accommodate both the outside dimension of a fiber-optic cable as well as a tool used for puncturing a companion drywall (tool and drywall not shown in this Fig.) Outside diameter of the cylindrical insert can be approximately ten millimeters. The diameter of the round lip can be approximately twenty millimeters. All diameters can be made larger, or smaller, if necessary or desirable, within reasonable limits.

As mentioned above, the hidden drop storage device is intended to be inserted into a hole in hallway-drywall. Since this device has a right angle bend, the accepting drywall hole necessarily needs to be at least as large as the outside diameter of cylindrical insert 102. In the worst case scenario, a rectangular hole of height $A_1$ and width $B_1$ would be needed to accept direct linear insertion of device 100, including attached bag 105 rolled-up tightly, or possibly in a compressed/crumpled condition, because distances $A_1$ and $B_1$ are no smaller than the largest linear vertical and horizontal distances of the inserted rigid portion of the device. However, preferably, the hole is the smallest possible to allow the required insertion and, typically, is round and slightly larger than the outside diameter of insert 102.

FIG. 2 also shows a front view of aperture 101, insert 102 and lip 103. An outline of a rectangular hole 204 of height $A_1$ and width $B_1$ are shown where device 100 is shown resting upon the bottom of the hole after it was inserted. Thus, there is a portion of the hole located above lip 103 that is not covered by the lip. The lip is preferably connected to the drywall (not shown in this Fig.) by a double-sided adhesive in the shape of a ring. There are also screw holes 201, 202 and 203 available to allow optional secure fastening of lip 103 to the drywall. Dimension $C_1$ is the inside width of hollow wall molding which must be larger than the distance of $A_1$ plus a lower portion of the lip to allow complete coverage of the hole and the device by the molding. These dimensions are verified for a particular molding at a building prior to instituting the disclosed pre-install operation at that site.

Figure 3:
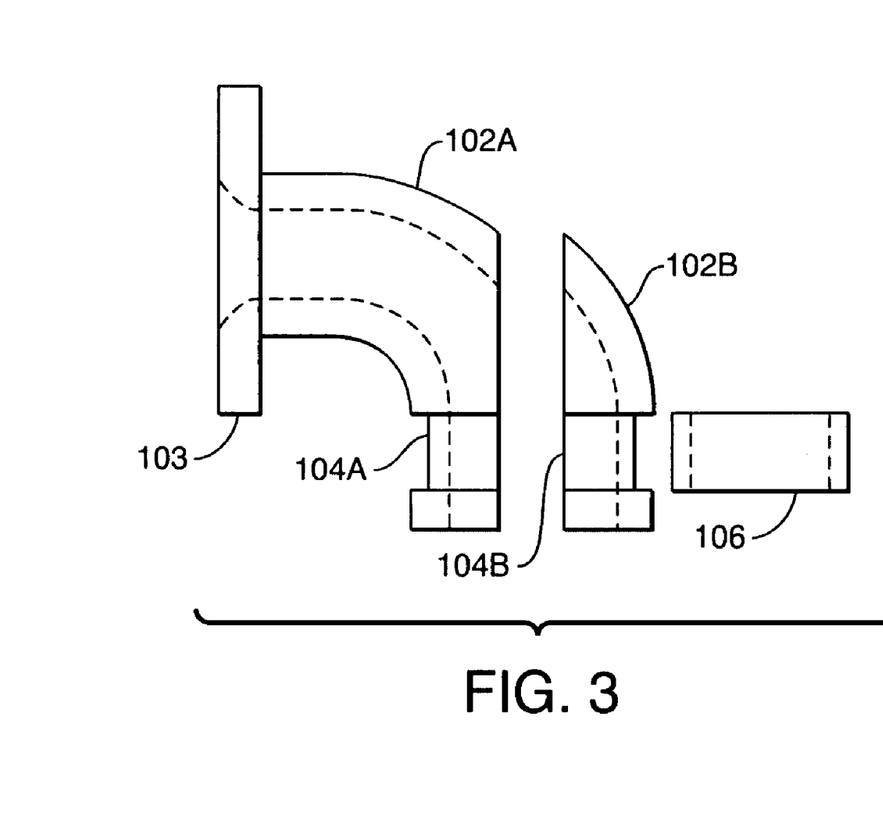
FIG. 3 is an exemplary and schematic side view of a portion of the hidden drop storage device of FIG. 1 in an unassembled condition.
Figure 4:
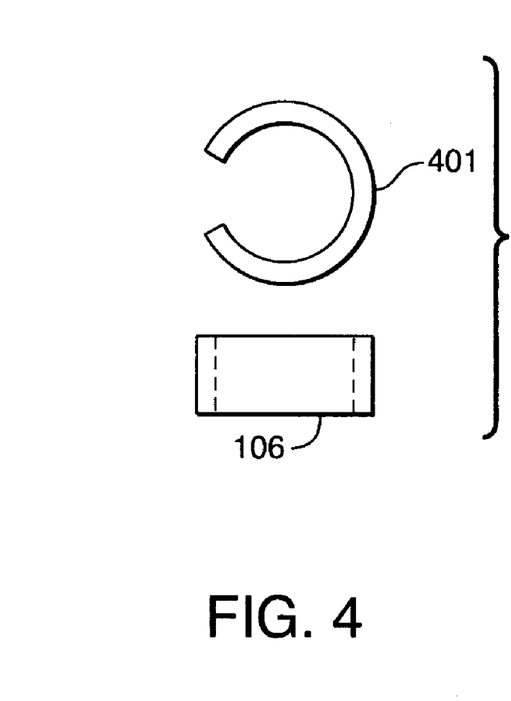
FIG. 4 are exemplary and schematic side and top views of the clip component that appears in the unassembled view of FIG. 3.

FIG. 3 is an exemplary and schematic side view of a portion of the hidden drop storage device of FIG. 1 in an unassembled condition. Lip 103, curvilinear piece 102A and downward portion 104A are all one-piece molded plastic. Companion curvilinear piece 102B and downward portion 104B mate with 102A and 104A and are held in place by metal or plastic clip 106. Clip 106 fits in a groove formed in 104A and 104B as shown. The holding strength of clip 106 is chosen to be minimal, but sufficient to hold 104A and 104B together, and to also hold the neck of plastic bag 105. FIG. 4 shows clip 106 in both side view 106 and top view 401, where it can be seen that the clip is designed to not completely surround the periphery of 104A/B, to allow easy breakaway of the hard plastic parts and easy fallaway of plastic bag 105, further discussed below.

Figure 5:
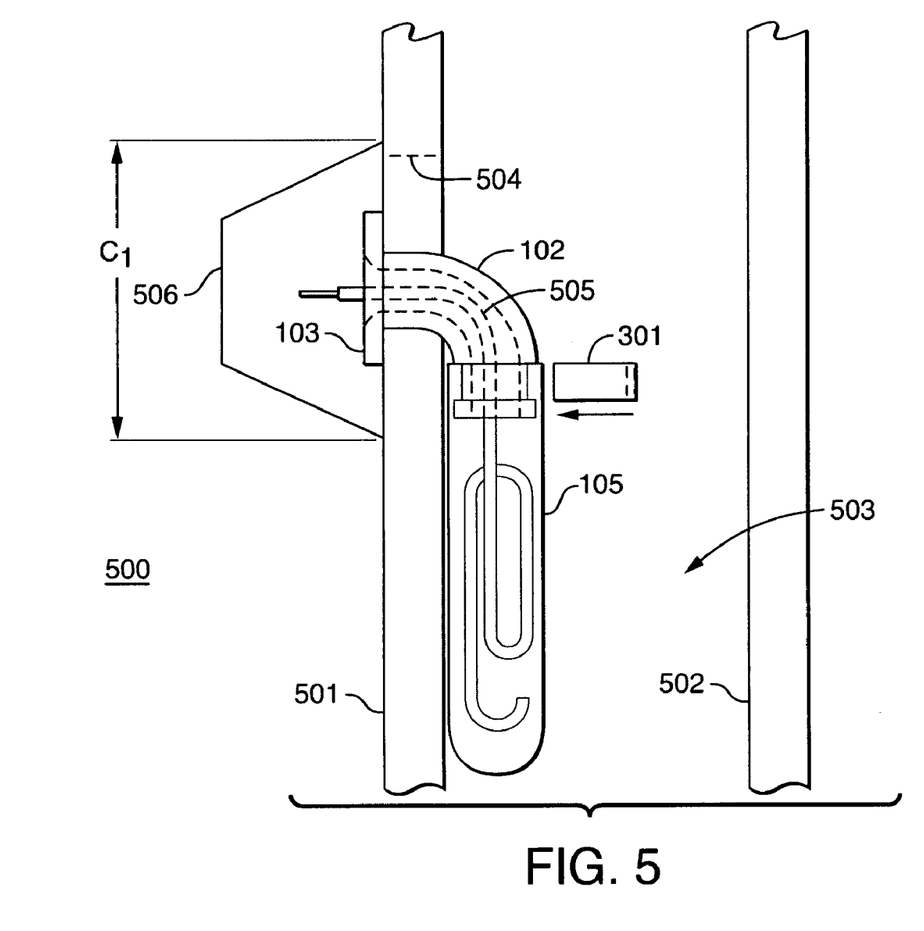
FIG. 5 is an exemplary and schematic side view of the hidden drop storage device of FIGS. 1 and 2 as it would appear storing a fiber drop in a clear plastic bag while mounted in a drywall.

FIG. 5 is an exemplary and schematic side view of the hidden drop storage device of FIGS. 1 and 2 as it would appear when storing a fiber drop in a clear plastic bag while mounted in a drywall. Wall 500 is formed by hallway-drywall 501, shown on edge, interfacing with a hallway to its left (second space, or common space, under control of the condominium or landlord) in combination with residence-drywall 502, shown on edge, interfacing with the interior of a resident's dwelling unit to its right (first space, or occupant's/tenant's space, under control of the occupant/tenant). The occupant or tenant is a first party and the condominium ownership or landlord is a second party, as the case may be. Drywall 501 of FIG. 5 and drywall 205 of FIG. 2 are essentially the same wall, where drywall 501 is an edge view and the drywall 205 is a face view. Drywalls 501 and 502 together form dead-space 503 located there-between. In this view, cylindrical insert 102, together with neatly rolled-up or crumpled plastic bag 105, had previously been inserted through a hole in drywall 501 having top boundary 504. Also, fiber-optic cable 505 had previously been fed through aperture 101 into clear plastic bag 105, shown coiled therein. Bag 105 is larger at the bottom than at the top, in a trapezoidal configuration, to encourage cable 505 to form "figure-eight" loops inside the bag when being fed into the bag. These loops are not necessary but are desirable because they offer a compact way to arrange the cable in the bag so that full bag volume may be utilized for storage. Hollow wall molding 506, shown on edge, has sufficient width dimension "C" so that it visually covers the hole from above upper hole boundary 504 to below the bottom of lip 103 when the molding is re-mounted to drywall 501.

Figure 6:
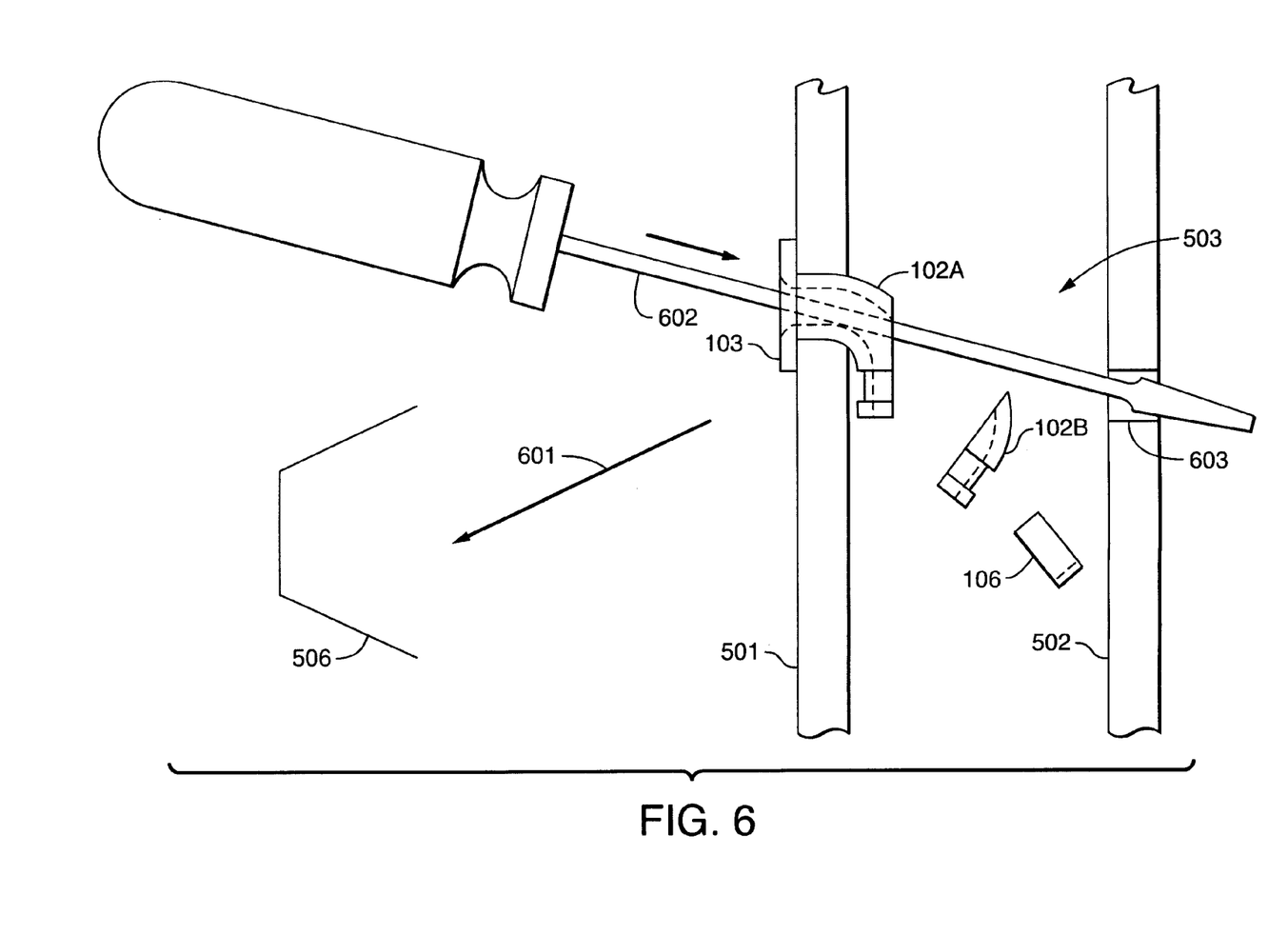
FIG. 6 is an exemplary and schematic side view of a hidden drop storage device in the process of being accessed to release stored cable for usage and showing how a hole may be made through the resident's drywall.

FIG. 6 is an exemplary and schematic side view of a hidden drop storage device in the process of being accessed to release stored cable for usage and showing how a hole may be made through the resident's drywall. Drywalls 501 and 502 are again shown on edge as in FIG. 5. Hallway molding 506 is removed from drywall 501 as shown by direction 601, exposing lip 103. A tool, such as screwdriver 602, is inserted into aperture 101 alongside cable 505 (not shown in this Fig. to enhance clarity of presentation) and is pressed against plastic piece 102B in the direction of the undesignated arrow associated with the screwdriver with sufficient force to overcome retaining force imposed by clip 106. This causes piece 102B and clip 106 to fall away as shown, whereby plastic bag 105 (also not shown in this Fig. to enhance clarity of presentation) also falls off, thereby allowing stored optical fiber to hang from drywall 501 and dangle in dead-space 503. Thereafter, the blade edge of the screwdriver is pressed against the dead-space side of drywall 502 with sufficient force, using a hammer if necessary, to penetrate drywall 502. Hole 603 is then visible from inside the residential unit and that hole can be better formed from inside the residential unit. A sufficiently long and sharply pointed awl, or a drill bit operated by power drill, can be used instead of a screwdriver which is shown only for illustrative purposes. This procedure is useful when a residence-side hole is desirable high on drywall 502, near the ceiling. Alternatively, when a lower hole near the floor of the residence is better, a hole can be drilled into residence drywall 502 near the floor baseboard directly below where the high hole would otherwise have been made and, assuming that enough cable length was stored in plastic bag 105 to reach the floor of the deadspace, the dangling cable can be fished through the lower hole as well.

Figure 7:
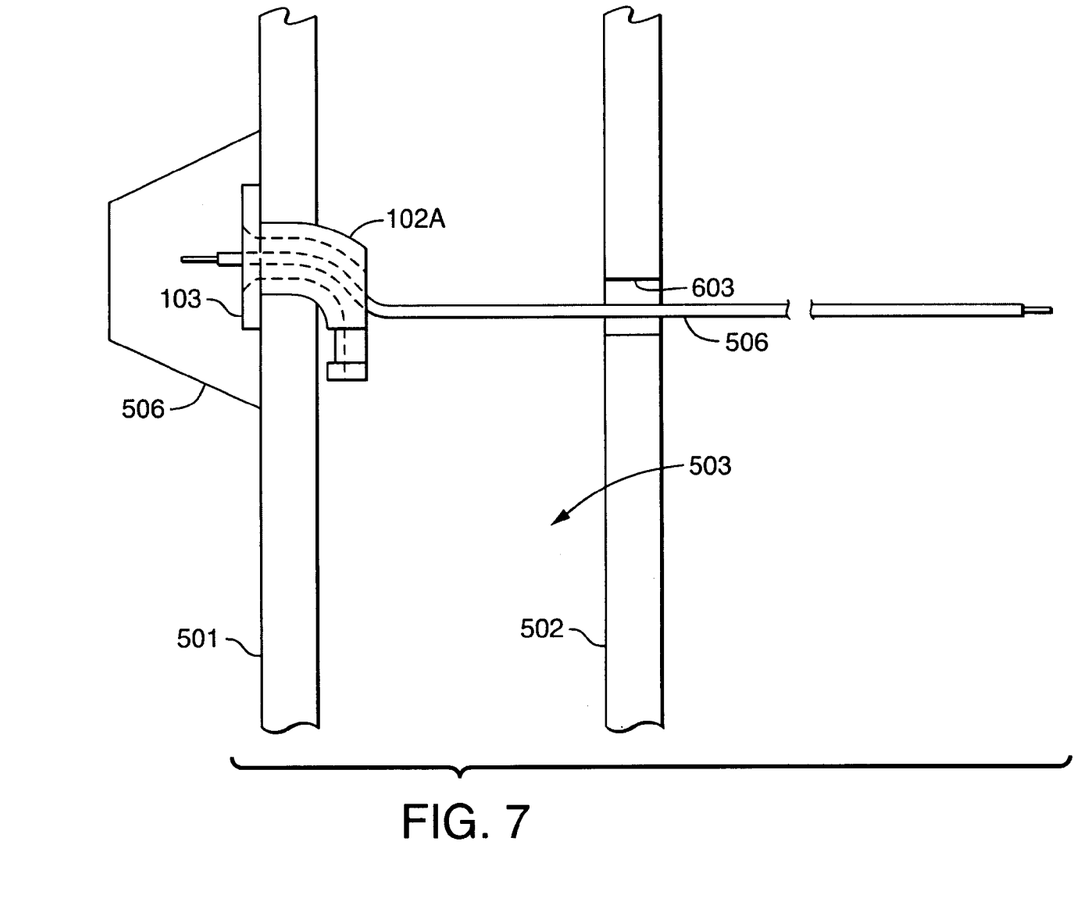
FIG. 7 is an exemplary and schematic side view of a hidden drop storage device after the hidden drop has been deployed to its associated residence.

FIG. 7 is an exemplary and schematic side view of a hidden drop storage device after the hidden drop has been deployed to its associated residence. After the piercing tool 602 is backed out of aperture 101, and after hole 603 (high or low) is better formed from inside the residential unit, the technician can use an appropriate tool, e.g., a stiff, but bendable, wire with a hook on one end. The tool can enter the dead-space from the residence side and blindly "fish" for cable 505, either dangling for a substantial distance in the case of the high hole or dangling for a shorter distance and lying loosely on the floor in dead-space 503 in the case of the low hole, until it is grabbed. Other kinds of articulating tools could be used. Once grabbed, the technician pulls the cable from dead-space 503 to residence space through hole 603, hides it behind panduit or behind residential molding, and places the end of the cable in the location where it shall be connected to an optical network terminal (ONT) inside the residence (probably inside a closet, or the like).

Alternatively, for any pair of holes in drywalls 501 and 502 at similar elevations, molding 506 can again be removed and the cable can be pulled from dead-space storage location 503 back into the hallway. A long, stiff solid wire or rod can then readily be inserted through aperture 101 in drywall 501 and through hole 603 in drywall 502 (similar to the screwdriver penetration from aperture 101 through hole 603 shown in FIG. 6) after a few tries, because the two holes are relatively aligned. This metal rod can act as a "needle", the end of which can be taped to cable 505 in the hallway. The metal rod is then pushed from hallway second space and/or pulled from residential side first space to bring the taped cable into the residential side directly. The tape is removed and the technician then has the cable in the residential side for installation purposes. The hallway molding is then replaced again and the job of installing fiber optic cable service to this residence can then routinely be completed.

Figure 8:
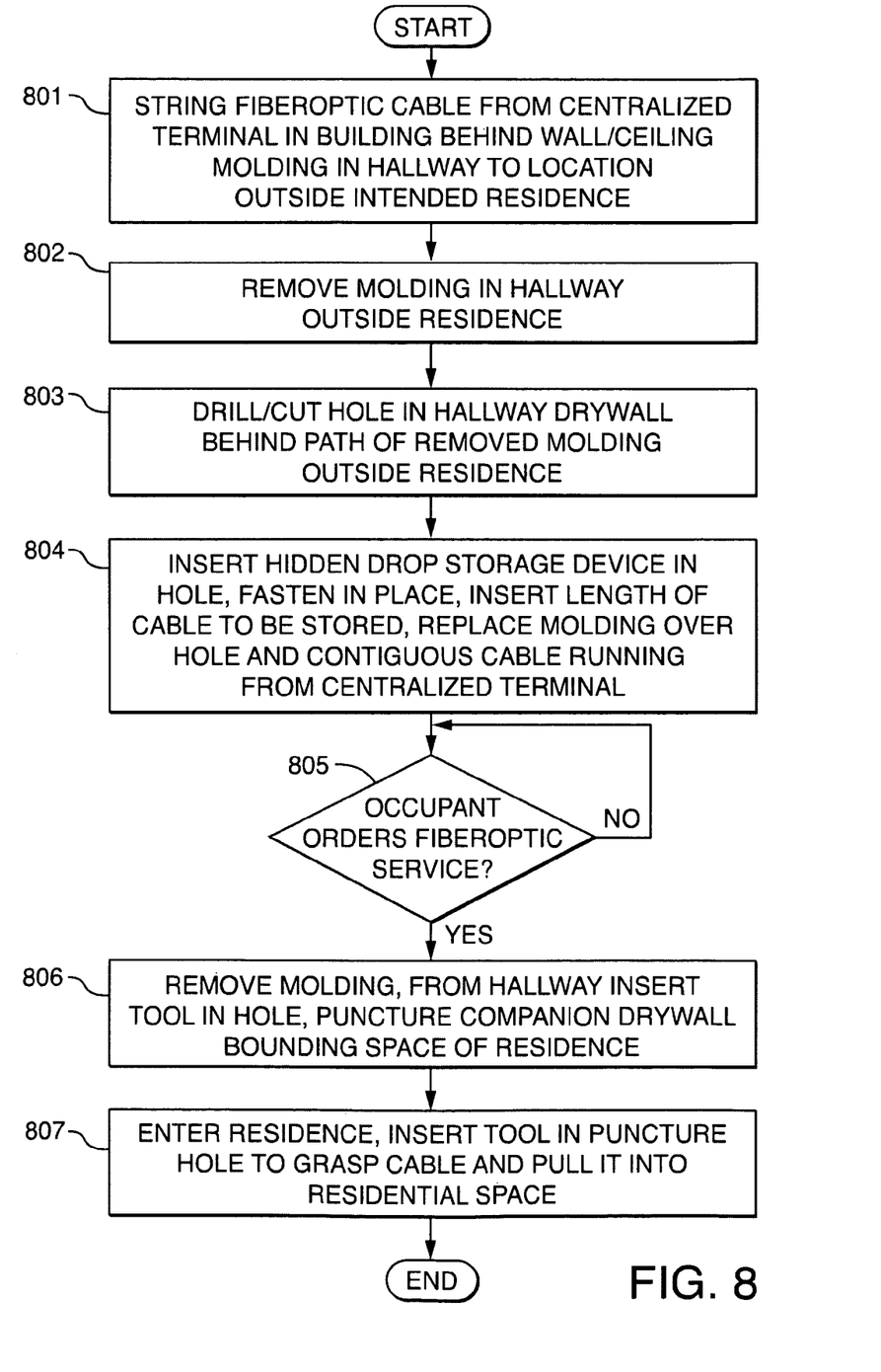
FIG. 8 is a flowchart depicting a method to be practiced in accordance with principles of the present invention.

FIG. 8 is a flowchart depicting a method to be practiced in accordance with principles of the present invention. In step 801 fiber optic cable is strung from a centralized terminal in a multi-unit building to a location near a residence unit intended to eventually receive communication service over that cable. In step 802 a molding is removed from a hallway wall outside the residence, the other side of the wall being residence space. In step 803, a hole is drilled or cut in the hallway dry wall at a location that shall be hidden by the molding when it is later replaced. In step 804 a hidden drop storage device is inserted in the hole and is fastened in place; the cable portion that is to be stored is inserted into the storage device holding bag by feeding the cable through an aperture in the device. In step 805 the query is made by the telecommunication services company: has the occupant/resident asked for cable service? If no, installation is not completed until such service is requested. If "yes", in step 806 the hallway molding is removed, a hole is made in the drywall of the residence by way of a tool inserted from the hole in the hallway drywall. In step 807, the stored cable is strung through the hole in the residence's drywall.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. There are other variations and modifications that can be made. Therefore, the specification and drawings are to be regarded in an illustrative rather than restrictive sense.

What is claimed is:

1. An apparatus, comprising:
    a container;
    a mechanism configured to:
        hold said container within a dead-space created by a pair of drywalls, said container being suspended from one of said drywalls, said pair of drywalls together forming a wall that separates first space from second space; and
        allow insertion of a portion of a communication cable into said container from said second space, thereby storing said portion of said cable in said container;
    wherein said mechanism comprises:
        mounting structure forming an aperture therethrough and mounted in said one of said drywalls; and
        breakaway structure, snap-connected to said mounting structure, for guiding said cable into said container when connected to said mounting structure and for breaking away from said mounting structure responsive to force applied by a hand-tool inserted through said aperture by a service person located in said second space, thereby exposing said portion of said cable to said dead-space.

2. The apparatus of claim 1 wherein said first space is under control of a first party and said second space is under control of a second party.

3. The apparatus of claim 2 wherein said first space is an apartment or condominium unit residence and said second space is a common hallway in a building containing said apartment or condominium residence.

4. The apparatus of claim 1 wherein said container is a plastic bag.

5. The apparatus of claim 1 wherein said one of said drywalls contains a drywall-hole in which said mounting structure is mounted, said mounting structure comprising:
    a lip containing fastening-holes, said lip being larger than said drywall-hole enabling fastening of said lip to said one of said drywalls through said fastening-holes to hold said breakaway structure and said container in place in said dead-space.

6. The apparatus of claim 1 wherein said drywall-hole and said lip are both sufficiently small to both be hidden from view by hollow wall-molding placed over said drywall-hole and said lip and affixed to said one of said drywalls in said second space.

7. A method, comprising:
    storing a portion of a communication cable in dead-space between a pair of drywalls forming a wall between a first space and a second space, said portion including an end of said cable not connected to anything, the remainder of said cable being located in said second space and contiguously connected to said portion of said cable through an aperture in one of said drywalls.

8. The method of claim 7, further comprising:
    puncturing a hole in the other of said drywalls;
    grasping said portion of said communication cable with a hand tool by reaching through said hole while located in said first space; and pulling said end of said communication cable through said hole from said dead-space into said first space.

9. The method of claim 8 wherein said first space is under control of a first party and said second space is under control of a second party.

10. The method of claim 9 wherein said first space is an apartment or condominium unit residence and said second space is a common hallway in a building containing said apartment or condominium residence.

11. The method of claim 8 wherein said puncturing through said other of said drywalls bounding said first space is accomplished by someone operating a tool in said second space.

12. The method of claim 8 wherein said remainder of said cable is operatively connected to a centralized service terminal located in said second space.

13. An apparatus, comprising:
a container suspended between inner surfaces of two drywalls, said drywalls together forming a wall, said surfaces forming a deadspace there-between, said container configured to store a portion of a communication cable received through an aperture formed in one of said drywalls, said portion including an end of said cable not connected to anything, substantially all of said communication cable other than said portion being located in a second space outside of said deadspace, said second space being bounded, in part, by an outer surface of said one of said drywalls.

14. The apparatus of claim 13 wherein said first space is an apartment or condominium unit residence and said second space is a common hallway in a building containing said apartment or condominium residence.

15. An apparatus, comprising:
a container;
a pair of drywalls forming a wall to separate first space on one side of said wall from second space on the other side of said wall;
a mechanism configured to:
suspend said container, in its entirety, within a dead-space bounded by interior surfaces of said pair of drywalls, said container being suspended from one of said drywalls; and
allow insertion of a portion of a communication cable into said container from said second space, thereby storing said portion of said cable in said container, said portion including an end of said cable not connected to anything, while substantially all of said communication cable other than said portion remains located in said second space.

16. The apparatus of claim 15 wherein said first space is under control of a first party and said second space is under control of a second party.

17. The apparatus of claim 15 wherein said mechanism comprises:
a mounting structure forming an aperture therethrough and mounted in said one of said drywalls; and
a breakaway structure, snap-connected to said mounting structure, for guiding said cable into said container when connected to said mounting structure and for breaking away from said mounting structure responsive to force applied by a hand-tool inserted through said aperture by a service person located in said second space, thereby exposing said portion of said cable to said dead-space.

18. The apparatus of claim 17 wherein said one of said drywalls contains a drywall-hole in which said mounting structure is mounted, said mounting structure comprising:
a lip containing fastening-holes, said lip being larger than said drywall-hole enabling fastening of said lip to said one of said drywalls through said fastening-holes to hold said breakaway structure and said container in place in said dead-space.

19. The apparatus of claim 18 wherein said drywall-hole and said lip are both sufficiently small to both be hidden from view by hollow wall-molding placed over said drywall-hole and said lip and affixed to said one of said drywalls in said second space.

20. The apparatus of claim 15 wherein said container is a plastic bag.

21. A system, comprising:
means for storing fiber-optic or similar communication cable hidden from view in an interior hallway of a condominium, apartment or similar building, a hallway wall of said hallway being constructed from two spaced-apart walls, outsides of said spaced-apart walls being opposites sides of said hallway wall, said storing means including means for suspending a container between inner surfaces of said spaced-apart walls, said container configured to store a portion of said communication cable received through an aperture formed in one of said spaced-apart walls, said portion including an end of said cable not connected to anything, all of said cable including said portion being at locations other than on one side of said hallway wall corresponding to one of said outsides.

22. An apparatus, comprising:
a container;
a pair of drywalls forming a wall to separate first space on one side of said wall from second space on the other side of said wall;
a mechanism configured to:
suspend said container, in its entirety, within a dead-space bounded by interior surfaces of said pair of drywalls, said container being suspended from one of said drywalls; and
allow insertion of a portion of a communication cable into said container from said second space, thereby storing said portion of said cable in said container, while substantially all of said communication cable other than said portion remains located in said second space;
wherein said mechanism comprises:
a mounting structure forming an aperture therethrough and mounted in said one of said drywalls; and
a breakaway structure, snap-connected to said mounting structure, for guiding said cable into said container when connected to said mounting structure and for breaking away from said mounting structure responsive to force applied by a hand-tool inserted through said aperture by a service person located in said second space, thereby exposing said portion of said cable to said dead-space.

23. An apparatus, comprising:
a container;
a pair of drywalls forming a wall to separate first space on one side of said wall from second space on the other side of said wall;
a mechanism configured to:
suspend said container, in its entirety, within a dead-space bounded by interior surfaces of said pair of drywalls, said container being suspended from one of said drywalls; and
allow insertion of a portion of a communication cable into said container from said second space, thereby storing said portion of said cable in said container, while substantially all of said communication cable other than said portion remains located in said second space;

wherein said one of said drywalls contains a drywall-hole in which said mounting structure is mounted, said mounting structure comprising a lip containing fastening-holes, said lip being larger than said drywall-hole enabling fastening of said lip to said one of said drywalls through said fastening-holes to hold said breakaway structure and said container in place in said dead-space.

* * * * *